May 24, 1938.  G. SCHNEIDER  2,118,446
METHOD OF MAKING TAPPETS
Filed Oct. 19, 1934
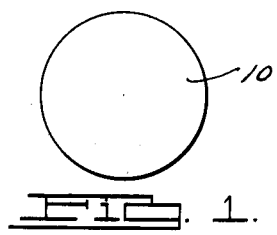
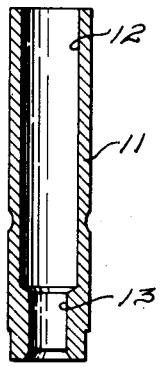
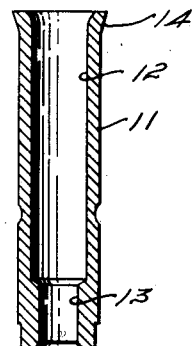
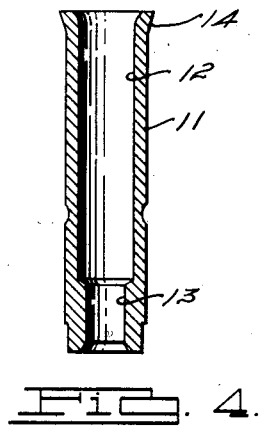
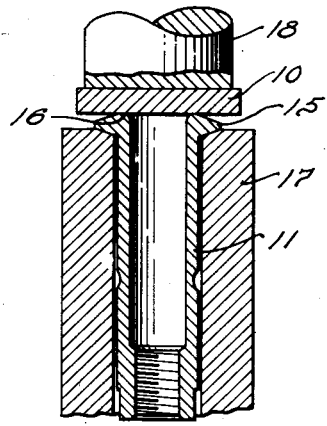
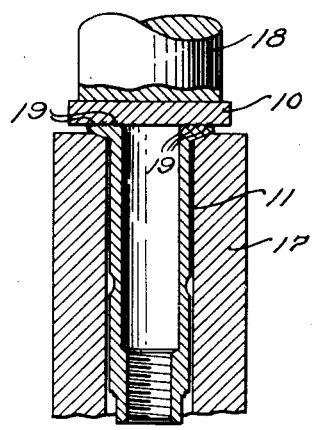
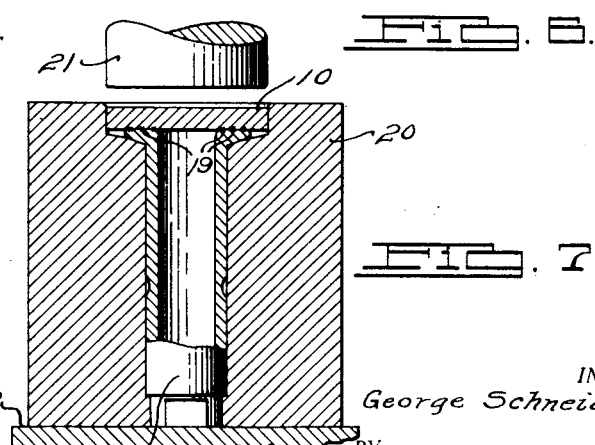
INVENTOR.
George Schneider.
BY
Harness, Dickey, Pierce & Hann
ATTORNEYS.

Patented May 24, 1938

2,118,446

UNITED STATES PATENT OFFICE 2,118,446

METHOD OF MAKING TAPPETS

George Schneider, Saginaw, Mich., assignor, by mesne assignments, to Eaton Manufacturing Company, Cleveland, Ohio, a corporation of Ohio Application October 19, 1934, Serial No. 749,013

4 Claims. (Cl. 29—156.7)

My invention relates to tappets or cam followers used in internal combustion engines to transmit a thrust of the cams to the valves.

My invention has particularly to do with the method of making such tappets.

The method of construction hereinafter described is an improvement upon the methods described in the pending application of George Schneider, Serial No. 726,041, filed May 17, 1934, which became Patent No. 2,055,342, issued September 22, 1936, and application of Harold I. Dyer, Serial No. 733,821, filed July 5, 1934, which became Patent No. 2,055,341, issued September 22, 1936.

One object of the invention is to provide a simple and cheap method of making a tappet, provided with a head or cam contacting face of hard wear-resisting material and a body portion of material which may be readily machined and forged.

A further object of the invention is to provide a novel method of securing a hard wear resisting cam contacting head to a machinable and forgeable body portion which diminishes to a minimum the amount of forging or machining of the hard head portion, which is of a material usually difficult to machine or forge.

Another object of the invention is to provide a method of securing a hard wear-resisting cam contacting head portion to a machinable and forgeable body portion which reduces to a minimum the amount of forging or machining of the head portion and eliminates upsetting the body portion prior to machining the same as well as reducing to a minimum the amount of forging of the body portion.

With the foregoing and other objects in view, the construction and the method are described with reference to the accompanying drawing, in which—

Fig. 1 is a plan of the cam contacting head of the tappet,

Fig. 2 is an edge elevation of the cam contacting head tappet,

Fig. 3 is a longitudinal cross-sectional view of the body portion of the tappet, Fig. 4 is a longitudinal cross-sectional view of the body portion of the tappet after the first flaring operation has been performed upon the end to which the cam contacting head is to be attached, Fig. 5 is a view similar to Fig. 4 showing the body portion of the tappet after the flanging operation upon the end to which the cam contacting head is to be attached, the body and head portions of the tappet being assembled in a welding jig.

Fig. 6 is a longitudinal cross-sectional view of the body and head portion after the head portion has been welded to the body portion; and Fig. 7 is a longitudinal cross-sectional view similar to Fig. 6 showing the completed tappet after the operation of straightening the head relative to the body portion and forging the entire assembly to length, the body and head portions being shown as positioned in a forging fixture.

The head or cam contacting portion of the tappet shown in Fig. 1 comprises a disc 10, which may be punched from sheet stock of suitable material or cast, or otherwise formed. The material, from which this disc is formed, is of a hard wear-resisting material, one suitable material being steel made according to standard S. A. E. specification No. 52-100. The head or disc is preformed to substantially the ultimate size by punching from sheet stock or by casting. It is then ground on both sides.

A body 11 is provided with a relatively large bore 12 entering at the upper end and continuing to a point short of the lower end, as shown in Fig. 3 of the drawing. This bore is made as large as possible consistent with the ultimate strengths desired in the walls of a tappet body. A smaller bore 13 is provided in the lower end of the body 11 which is later tapped to receive the threaded shank of the conventional adjusting stud used in tappets to adjust the clearance between the end tappet body and the end of the valve stem with which the tappet contacts. After the boring operations have been completed, the body is forged, as shown in Fig. 4, either cold or hot, preferably cold to provide a flare indicated by the numeral 14 on the upper end of the tappet as shown in the drawing. This partially upsets the upper end of the tappet body 11.

The next operation, as shown in Fig. 5, consists in completing the upsetting of the flared end portion 14 to form a seat for the head 10 in the nature of a supporting flange 15 on the upper end of the body, as shown in the drawing. This is done preferably by hot forging and provides a tapered flange 15, as shown, having a raised portion indicated by the numeral 16 around the upper surface of the flange and located at a point which will induce the welding current used to fasten the head 10 to the body 11 to pass initially through the thickest portion of the flange 15, and to start the weld, indicated at 19 in Fig. 6 and Fig. 7, well to the inside of the flange. This welding operation is preferably electrical and may be carried out by a welding fixture comprising a hollow welding electrode 17 and a second electrode 18 which press the head portion 10 against the raised portion 16 of flange 15. While the electric current is passing through the flange 15 and head 10, the position of the annular raised ridge or rim 16 on the flange 15 insures the starting of the welding operation well to the inside of the flange, and as the welding progresses the contact portion of the raised ridge 16 is changed from an annular line to an increasingly larger annular area until substantially the entire upper surface of the flange 15 is securely welded to the underside of the head 10 as shown at 19 in Fig. 6.

After the welding operation, the assembly is preferably reheated to a suitable forging temperature and then placed in a sizing and straightening fixture, which preferably comprises a die member 20, a plunger 21 and a support 22 for closing the lower end of the bore of the die member 20, by which fixture the assembly is forged to reduce its overall length to the desired finished length, and the head portion 10 is straightened relative to the body portion 11. The assembly may then be heat treated and finished ground.

Formal changes may be made in the specific embodiment of the invention described without departing from the spirit or substance of the broad invention, the scope of which is commensurate with the appended claims.

I claim:

1. The method of making a tappet which comprises, forming a tubular body portion from readily machineable and forgeable material to provide a relatively small bore in one end thereof and a relatively large bore in the other end thereof, forming an outwardly directed annular flange on said relatively large bore end, forming a plane-surfaced disc of wear-resisting but less readily machineable and forgeable material than that from which said body portion is made, and then welding a plane surface of said disc to said flange and forging said assembled disc and body portion to straighten said disc relative to said body portion and to shorten said assembly to a predetermined ultimate length while maintaining substantially the plane-surfaced form of the disc.

2. The method of making a tappet which comprises, forming a tubular body portion from readily machineable and forgeable material to provide a relatively small bore in one end thereof and a relatively large bore in the other end thereof, flaring said large bore end outwardly, forging said outwardly flared end to upset such end of the body portion and to provide an outwardly directed annular flange thereon, forming a plane-surfaced disc of wear-resisting but less readily machineable and forgeable material than that from which said body portion is made, and then welding a plane surface of said disc to said flange and forging said assembled disc and body portion to straighten said disc relative to said body portion and to shorten said assembly to a predetermined ultimate length while maintaining substantially the plane-surfaced form of the disc.

3. The method of making a tappet which comprises, machining a tubular body portion to substantially ultimate form from readily machineable and forgeable material to provide a relatively small bore in one end thereof and a relatively large bore in the other end thereof, flaring said large bore end outwardly, forging said outwardly flared end to upset such end of the body portion and provide an outwardly directed annular flange thereon, forming a plane-surfaced disc of wear-resisting but less readily machineable and forgeable material than that from which said body portion is made, and then welding a plane surface of said disc to said flange and forging said assembled disc and body portion to straighten said disc relative to said body portion and to shorten said assembly to a predetermined ultimate length while maintaining substantially the plane-surfaced form of the disc.

4. The method of making a tappet which comprises, machining a tubular body portion to substantially ultimate form from readily machineable and forgeable material to provide a relatively small bore in one end thereof and a relatively large bore in the other end thereof, cold forging the relatively large bore end of said body portion to flare the same outwardly and partially to upset such end, then hot forging the flared end of said body portion further to upset said end and to form an outwardly directed annular flange thereon, forming a plane-surfaced disc of wear-resisting but less readily machineable and forgeable material than that from which said body portion is made, and then welding a plane surface of said disc to said flange and forging said assembled disc and body portion to straighten said disc relative to said body portion and to shorten said assembly to a predetermined ultimate length while maintaining substantially the plane-surfaced form of the disc.

GEORGE SCHNEIDER.